US009276779B2

(12) United States Patent
Davis et al.

(10) Patent No.: US 9,276,779 B2
(45) Date of Patent: Mar. 1, 2016

(54) SYSTEM AND METHOD FOR PROVIDING A FULL FAIL-SAFE CAPABILITY IN SIGNAL TRANSMISSION NETWORKS

(71) Applicant: INTERSIL AMERICAS INC., Milpitas, CA (US)

(72) Inventors: Christopher Keith Davis, Malabar, FL (US); Jeffrey David Lies, Palm Bay, FL (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 14/513,905

(22) Filed: Oct. 14, 2014

(65) Prior Publication Data

US 2015/0030057 A1    Jan. 29, 2015

Related U.S. Application Data

(62) Division of application No. 12/847,071, filed on Jul. 30, 2010, now Pat. No. 8,971,387.

(60) Provisional application No. 61/250,487, filed on Oct. 9, 2009.

(51) Int. Cl.
H04B 1/38 (2015.01)
H04L 25/02 (2006.01)

(52) U.S. Cl.
CPC ........ H04L 25/0276 (2013.01); H04L 25/0292 (2013.01)

(58) Field of Classification Search
CPC ............ H03K 19/1737; H03H 11/265; G09G 2310/0254

USPC .......................................... 375/219; 327/237
See application file for complete search history.

(56) References Cited

U.S. PATENT DOCUMENTS 4,725,748 A *  2/1988  Hayes et al. .................. 327/277
5,247,398 A     9/1993  Sidman
(Continued)

FOREIGN PATENT DOCUMENTS

CN    1297638    5/2001
CN    1348591    5/2002
(Continued)

OTHER PUBLICATIONS

U.S. Patent and Trademark Office, "Notice of Allowance", "from U.S. Appl. No. 12/847,071", Nov. 5, 2014, pp. 1-14, Published in: US.
(Continued)

*Primary Examiner* — Leila Malek
(74) *Attorney, Agent, or Firm* — Fogg & Powers LLC

(57) ABSTRACT

Systems and methods for providing a full fail-safe capability in signal transmission networks are disclosed. For example, a system for providing a full fail-safe capability in signal transmission networks includes at least a first electronic circuit to transmit and receive signals or data, at least one driver unit coupled to the at least a first electronic circuit, and at least one receiver unit coupled to the at least a first electronic circuit and the at least one driver unit. The at least one receiver unit includes at least one offset signal generating unit, a signal comparing unit, and a switching unit to couple an offset signal from the at least one offset signal generating unit to an input of the signal comparing unit.

17 Claims, 5 Drawing Sheets

(56) References Cited

U.S. PATENT DOCUMENTS

| | | | |
|---|---|---|---|
| 5,903,613 | A | 5/1999 | Ishida |
| 6,036,091 | A * | 3/2000 | Spitz .................. 235/462.25 |
| 6,204,980 | B1 | 3/2001 | Momtaz et al. |
| 6,519,106 | B1 | 2/2003 | Goh et al. |
| 6,684,195 | B1 * | 1/2004 | Deaton et al. .............. 705/14.13 |
| 7,081,785 | B2 | 7/2006 | Mori et al. |
| 7,130,179 | B2 | 10/2006 | Guiraud et al. |
| 2003/0041298 | A1 | 2/2003 | Bruner et al. |
| 2004/0090692 | A1 | 5/2004 | Tretter |
| 2004/0174929 | A1 | 9/2004 | Khorram et al. |
| 2006/0066972 | A1 | 3/2006 | Martin |
| 2006/0152838 | A1 | 7/2006 | Fitzgerald et al. |
| 2006/0245508 | A1 | 11/2006 | Takamuku |
| 2007/0211373 | A1 | 9/2007 | Lee et al. |
| 2007/0260758 | A1 | 11/2007 | Yen |
| 2007/0293167 | A1 * | 12/2007 | Shridhar et al. .............. 455/130 |
| 2008/0284635 | A1 * | 11/2008 | Blatz et al. .................... 341/158 |
| 2009/0113702 | A1 | 5/2009 | Hogg |
| 2009/0296259 | A1 | 12/2009 | Mukal et al. |
| 2009/0319876 | A1 | 12/2009 | Chiba |
| 2010/0223534 | A1 | 9/2010 | Earnshaw et al. |
| 2010/0329325 | A1 * | 12/2010 | Mobin et al. .................. 375/232 |

FOREIGN PATENT DOCUMENTS

| | | |
|---|---|---|
| CN | 1540870 | 10/2004 |
| CN | 1859015 | 11/2006 |
| JP | 09329460 | 12/1997 |
| JP | 2008294751 | 12/2008 |
| KR | 1019990020273 | 3/1999 |
| KR | 100476617 | 3/2002 |
| WO | 9948260 | 9/1999 |
| WO | 0063906 | 10/2000 |

OTHER PUBLICATIONS

Chinese Patent Office, "Office Action from CN Application No. 201010505800.0 mailed Jan. 22, 2013", "from Foreign Counterpart of U.S. Appl. No. 12/847,071", Jan. 22, 2013, pp. 1-5, Published in: CN.

Chinese Patent Office, "Second Office Action from CN Application No. 201010505800.0 mailed Jul. 4, 2013", "from Foreign Counterpart of U.S. Application No.", Jul. 4, 2013, pp. 1-16, Published in: CN.

The State Intellectual Property Office of the People's Republic of China, "Third Office Action from CN Application No. 201010505800.0 mailed Nov. 28, 2013", "from Foreign Counterpart of U.S. Appl. No. 12/847,071", Nov. 28, 2013, pp. 1-8, Published in: CN.

The State Intellectual Property Office of the People's Republic of China, "Notice on Grant of Patent Right for Invention from CN Application No. 201010505800.0 mailed Mar. 21, 2014", "from Foreign Counterpart of U.S. Appl. No. 12/847,071", Mar. 21, 2014, pp. 1-4, Published in: CN.

The German Patent and Trade Mark Office, "Office Action from DE Application No. 10 2010 038 046.6 mailed Nov. 12, 2013", "from Foreign Counterpart of U.S. Appl. No. 12/847,071", Nov. 12, 2013, pp. 1-11, Published in: DE.

The Korean Intellectual Property Office, "Notice of Allowance from KR Application No. 10-2010-0098402 mailed May 17, 2012", "from Foreign Counterpart of U.S. Appl. No. 12/847,071", May 17, 2012, pp. 1-3, Published in: KR.

Taiwain Intellectual Property Office, "First Office Action from TW Application No. 099134343 mailed May 14, 2014", May 14, 2014, pp. 1-7, Publisher: from Foreign Counterpart of U.S. Appl. No. 12/847,071, Published in: TW.

"MAXIM +15kV ESD-Protected, Fail-Safe, High-Speed (10Mbps), Slew-Rate-Limited RS-485/RS-422 Transceivers", "Datasheet MAX3080E-MAX3089E", 2000, Publisher: MAXIM.

"+5V, Fail-Safe, 20Mpbs, Profibus RS-485/RS-422 Transceivers", "Datasheet MAX3460-MAX3464", 2003, Publisher: MAXIM.

"70-V Fault-Protected RS-485 Transceiver With Cable Invert", "TI Datasheet SN65HVD1794, SN65HVD1795, SN65HVD1796", Aug. 2008, Publisher: Texas Instruments.

* cited by examiner

SYSTEM AND METHOD FOR PROVIDING A FULL FAIL-SAFE CAPABILITY IN SIGNAL TRANSMISSION NETWORKS

CROSS REFERENCE TO RELATED APPLICATIONS

This application is a divisional of U.S. patent application Ser. No. 12/847,071 entitled "SYSTEM AND METHOD FOR PROVIDING A FULL FAIL-SAFE CAPABILITY IN SIGNAL TRANSMISSION NETWORKS," filed on Jul. 30, 2010, and claims the benefit of U.S. Provisional Patent Application Ser. No. 61/250,487 entitled "RS-485 RECEIVER WITH A FULL FAIL-SAFE POLARITY INVERSION FUNCTION," filed on Oct. 9, 2009. U.S. Provisional Patent Application Ser. No. 61/250,487 and U.S. patent application Ser. No. 12/847,071 are incorporated herein by reference.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
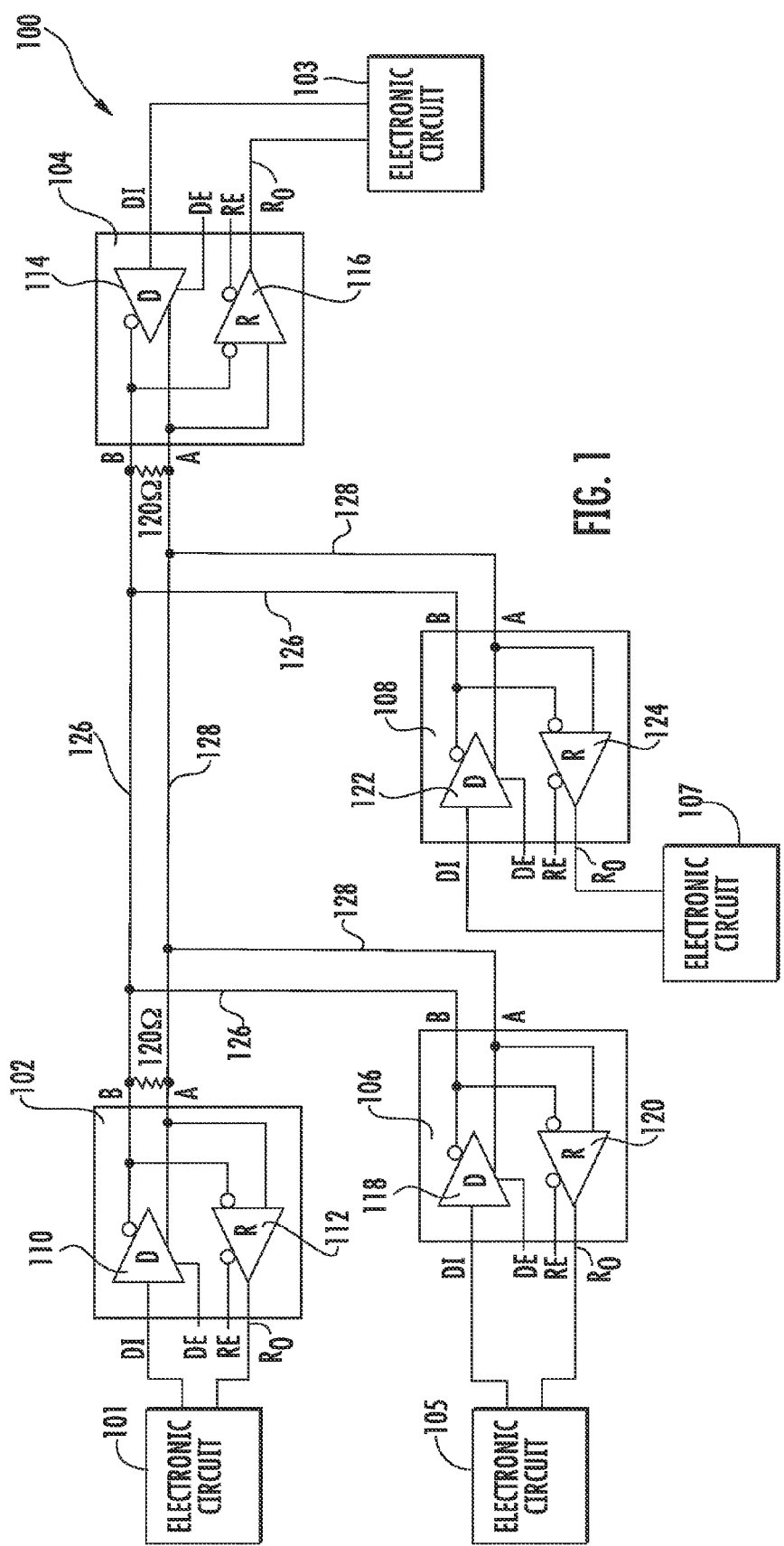
FIG. 1 is a block diagram showing a system that can be utilized to implement one embodiment of the present invention.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense.

FIG. 1 is a block diagram showing a system 100, which can be utilized to implement one embodiment of the present invention. For example, system 100 can be a signal transmission network, such as a network of one or more transmitters that convey analog or digital signals to one or more receivers via signal communication lines. As another example, system 100 can be a network of signal drivers (e.g., transmitters) and receivers connected in a bus configuration. As still another example, system 100 can be a differential data transmission network operated in accordance with the RS-485 or RS-422 data transmission standard or protocol.

Referring to FIG. 1, system 100 includes a first electronic circuit 101 coupled to a first transceiver 102, a second electronic circuit 103 coupled to a second transceiver 104, a third electronic circuit 105 coupled to a third transceiver 106, and a fourth electronic circuit 107 coupled to a fourth transceiver 108. For example, in one embodiment, each electronic circuit 101, 103, 105, 107 is a circuit that generates and receives signals or data to be conveyed via a respective transceiver 102, 104, 106, 108 to a different transceiver 102, 104, 106, 108. One example of such a circuit is a sensor circuit connected to a transceiver 102, 104, 106, or 108 to provide signal information or data to a controller connected to a different transceiver in the network involved. Also, for example, in one embodiment, each transceiver 102, 104, 106, 108 transmits and receives differential signals. Note that although four electronic circuits and transceivers are shown, the number of electronic circuits and transceivers that can be utilized in such a network is merely a design constraint. As such, system 100 can include more or less than the four electronic circuits and transceivers shown. For example, system 100 might include two electronic circuits and transceivers, such as first and second electronic circuits 101, 103 and first and second transceivers 102, 104.

Each transceiver 102, 104, 106, and 108 includes a signal transmitting/receiving pair. For example, first transceiver 102 includes a first driver (e.g., transmitter) unit 110 and a first receiver unit 112, second transceiver 104 includes a second driver unit 114 and a second receiver unit 116, third transceiver 106 includes a third driver unit 118 and a third receiver unit 120, and fourth transceiver 108 includes a fourth driver unit 122 and a fourth receiver unit 124. An input (DI) of each driver unit 110, 114, 118, 122 is connected to an output of a respective electronic circuit 101, 103, 105, 107, and an output (RO) of each receiver unit 112, 116, 120, 124 is connected to an input of the respective electronic circuit. Also, each driver unit is coupled to a receiver in a different transceiver by the signal communication lines 126, 128. For example, in one embodiment, signal communication lines 126, 128 can be a network bus that conveys differential signals from a driver unit of a "master" transceiver (e.g., transceiver 102) to a receiver unit of a "slave" transceiver (e.g., transceiver 104, 106, or 108).

Figure 2:
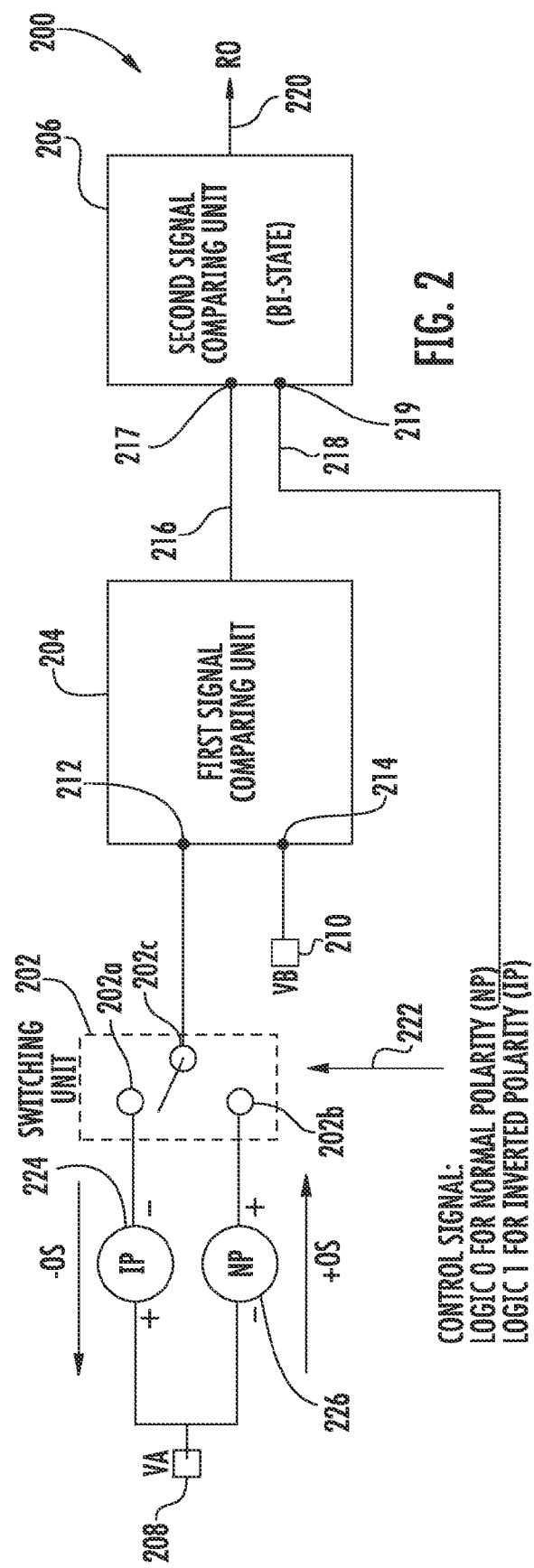
FIG. 2 is a schematic block diagram of a receiver circuit that can be utilized to implement one embodiment of the present invention.

FIG. 2 is a schematic block diagram of a receiver circuit 200, which can be utilized to implement one embodiment of the present invention. For example, receiver circuit 200 can be utilized to implement a full fail-safe function for at least one receiver unit 112, 116, 120, 124 of system 100 shown in FIG. 1. As such, receiver circuit 200 can be implemented as a component part of each receiver unit 112, 116, 120, 124, an entire receiver unit 112, 116, 120, or 124, or a separate circuit from that of each receiver unit 112, 116, 120, 124. In any event, receiver circuit 200 prevents a network receiver from outputting erroneous signals if the polarities of the received signals are electronically reversed (e.g., rather than rewire an improperly wired transmission line connection). For example, in one embodiment, a differential signal transmission network includes a full fail-safe capable receiver circuit 200 for a network receiver, which prevents the receiver from outputting a false start bit (e.g., output initially transitioning from a logic "1" to a logic "0" state) if a reverse polarity logic control function is utilized to electronically reverse the polarities of the received signals by inverting the receiver's output to obtain the desired logic sense, the receiver's inputs are disconnected from the bus (fail-safe open), or the receiver's inputs have a near-zero volt differential signal applied (fail-safe shorted or idle and terminated).

Referring to FIG. 2, receiver circuit 200 includes a switching unit 202, a first signal comparing unit 204, and a second signal comparing unit 206. For example, in one embodiment, switching unit 202 can be implemented utilizing an analog transistor switch (e.g., MOS Field Effect Transistor or MOSFET), first signal comparing unit 204 can be implemented utilizing a comparator, and second signal comparing unit can be implemented utilizing an exclusive-OR (XOR) logic gate. In that regard, for example, receiver circuit 200 can be manufactured utilizing a bipolar and/or Complementary MOSFET (CMOSFET) manufacturing technology. In a second embodiment, for example, first signal comparing unit 204 can be implemented utilizing a circuit or device that algebraically subtracts two (e.g., differential) input signals and outputs a positive signal (e.g., output is "high" or a logic "1") if the algebraic difference of the two input signals is positive or greater than zero, and outputs a negative signal (e.g., output is "low" or a logic "0") if the algebraic difference of the two input signals is negative or less than zero. Also, second signal comparing unit 206 can be implemented utilizing a multiplexer and an inverter. For example, second signal comparing unit 206 can function as a multi-state signal comparing unit, which receives two input signals and outputs a positive signal (e.g., output is "high" or a logic "1") if one of the two input signals is positive or "high", or outputs a negative signal (e.g., logic "0") if the two input signals are equivalent.

Receiver circuit 200 also includes a first input connection 208 and a second input connection 210. For example, first input connection 208 can be connected to signal communication line 128 in FIG. 1, and second input connection 210 can be connected to signal communication line 126. In that regard, a (e.g., differential) signal conveyed on signal communication lines 126, 128 can be received at first and second input connections 208, 210. First input connection 208 is also connected to a first input 212 of first signal comparing unit 204 via switching unit 202. For example, first input connection 208 can be connected to first input 212 via a first offset signal (e.g., −OS) generating unit 224, a first switch contact 202a, and a second switch contact 202c. In one embodiment, first offset signal generating unit 224 generates a negative offset voltage. Alternatively, for example, first input connection 208 can be connected to first input 212 via a second offset signal (e.g., +OS) generating unit 226, a third switch contact 202b, and second switch contact 202c. In one embodiment, second offset signal generating unit 226 generates a positive offset voltage. The position of switching unit 202 is controlled by a predetermined control signal, which is input on line 222. For example, the control signal can be input directly or indirectly by a network designer or user. Second input connection 210 is connected to a second input 214 of first signal comparing unit 204.

An output of first signal comparing unit 204 is connected by a line 216 to a first input 217 of second signal comparing unit 206, and a second line 218 is connected to a second input 219 of second signal comparing unit 206. A predetermined control signal is input on second line 218. For example, if a normal signal polarity condition exists (e.g., the polarities of the received signals are not electronically reversed), a logic "0" can be input to second signal comparing unit 206 on line 218. Alternatively, for example, if a reverse signal polarity condition exists (e.g., the polarities of the received signals are electronically reversed), a logic "1" can be input to second signal comparing unit 206 on line 218. In one embodiment, the control signal input on line 218 is also input on line 222. In a second embodiment, different control signals are input on lines 218 and 222. In any event, an output signal from second signal comparing unit 206 (and receiver circuit 200) is conveyed on line 220 (e.g., to an input connection of an electronic circuit 101, 103, 105, 107 shown in FIG. 1). For example, an output signal from second signal comparing unit 206 can be signal $R_O$, which is an output signal for any receiver unit 112, 116, 120, 124 shown in FIG. 1.

Figure 3:
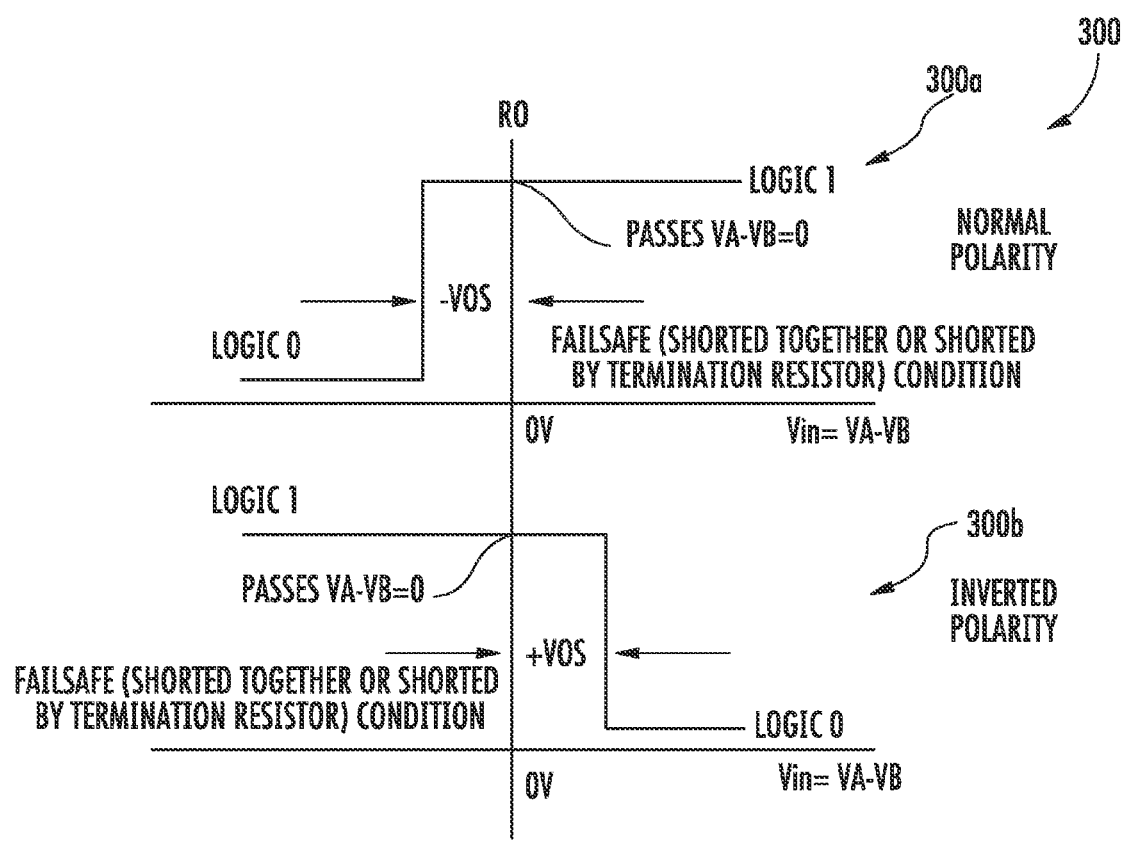
FIG. 3 is a pictorial diagram of a plurality of signal waveforms that represent an output signal from a receiver circuit for a normal polarity condition and an inverted polarity condition.

FIG. 3 is a pictorial diagram 300 of a plurality of signal waveforms, which represent an output signal (e.g., $R_O$) from receiver circuit 200 for a normal and an inverted (e.g., reversed) polarity condition. In operation, referring to FIGS. 2 and 3, if a normal signal polarity condition exists (e.g., the polarities of the received signals are not electronically reversed), a control signal (e.g., logic "0") input on line 222 causes switching unit 202 to connect first input connection 208 to first input 212 via second signal offset generator unit 226. This configuration adds a positive offset signal (e.g., +OS) to a signal received on first input connection 208. Also, a logic "0" signal is input on line 218. Consequently, with a positive offset signal applied to first input 212, the output of first signal comparing unit 204 is high (e.g., logic "1"). The logic "0" signal on line 218 causes second signal comparing unit 206 to function as a non-inverting unit, and the output of second signal comparing unit 206 is thus high. As shown by the normal polarity waveform 300a, output signal $R_O$ is high when the first input signal, VA, minus the second input signal, VB, is equal to zero. This result indicates that in the absence of an input signal (e.g., the input connections are open or floating but defined by an internal reference, the inputs are shorted together, or the inputs are shorted by a termination resistor), the output signal remains in the logic "1" state, and fail-safe functionality is being provided by receiver circuit 200 for the normal polarity condition.

If an inverted signal polarity condition exists (e.g., the polarities of the received signals are electronically reversed), a control signal (e.g., logic "1") input on line 222 causes switching unit 202 to connect first input connection 208 to first input 212 via first offset signal generator unit 224. This configuration adds a negative offset signal (e.g., −OS) to a signal received on first input connection 208. Also, a logic "1" signal is input on line 218, which causes second signal comparing unit 206 to function as a signal inverting unit. Consequently, with a negative offset signal applied to the first input 212, the output of first signal comparing unit 204 is low (e.g., logic "0"), and the output of second signal comparing unit 206 is high (e.g., logic "1"). As shown by the inverted polarity waveform 300b, output signal $R_O$ is high when the first input signal, VA, minus the second input signal, VB, is equal to zero. This result indicates that in the absence of an input signal (e.g., the input connections are open or floating, shorted together, or shorted by a termination resistor), the output signal remains in the logic "1" state, and fail-safe functionality is also being provided by receiver circuit 200 for the inverted or reverse polarity condition. As such, by providing fail-safe capability for both the normal and inverse polarity conditions, receiver circuit 200 provides full fail-safe functionality for the signal transmission network involved. If the signal transmission network is a differential signal transmission network, receiver circuit 200 provides full fail-safe functionality over the entire receive common-mode voltage range.

Figure 4:
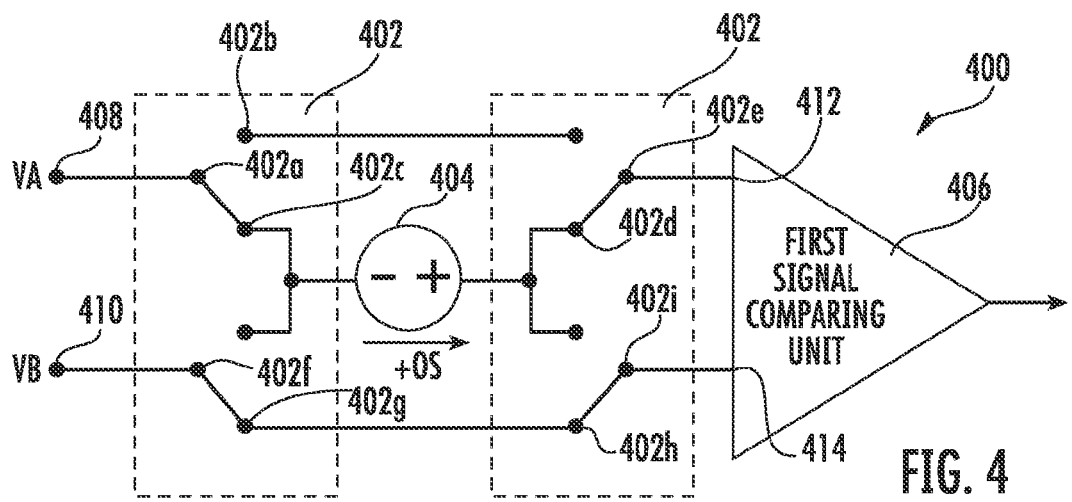
FIG. 4 is a schematic block diagram of a second receiver circuit that can be utilized to implement offset signal generation in a signal transmission network.

FIG. 4 is a schematic block diagram of a receiver circuit 400, which can be utilized to implement one embodiment of the present invention. For example, receiver circuit 400 can be utilized to implement an alternative input section for receiver circuit 200 shown in FIG. 2. Referring to FIG. 4, receiver circuit 400 includes a switching unit 402, a positive offset signal generating unit 404, and a first signal comparing unit 406. Receiver circuit 400 also includes a first input connection 408 and a second input connection 410. For example, first input connection 408 can be connected to signal communication line 128 in FIG. 1, and second input connection 410 can be connected to signal communication line 126. In that regard, a (e.g., differential) signal conveyed on signal communication lines 126, 128 can be received at first and second input connections 408, 410. First input connection 408 is also connected to a first input 412 of first signal comparing unit 406 via switching unit 402. For this example implementation, first input connection 408 is connected to first input 412 via an offset signal (e.g., +OS) generating unit 404, a first switch contact 402a, a second switch contact 402c, a third switch contact 402d, and a fourth switch contact 402e. Also, second input connection 410 is connected to a second input 414 of first signal comparing unit 406 via a fifth switch contact 402f, a sixth switch contact 402g, a seventh switch contact 402h, and an eighth switch contact 402i. In this implementation, a positive offset signal can be added to the signal received on first input connection 408 or second input connection 410.

Figure 5:
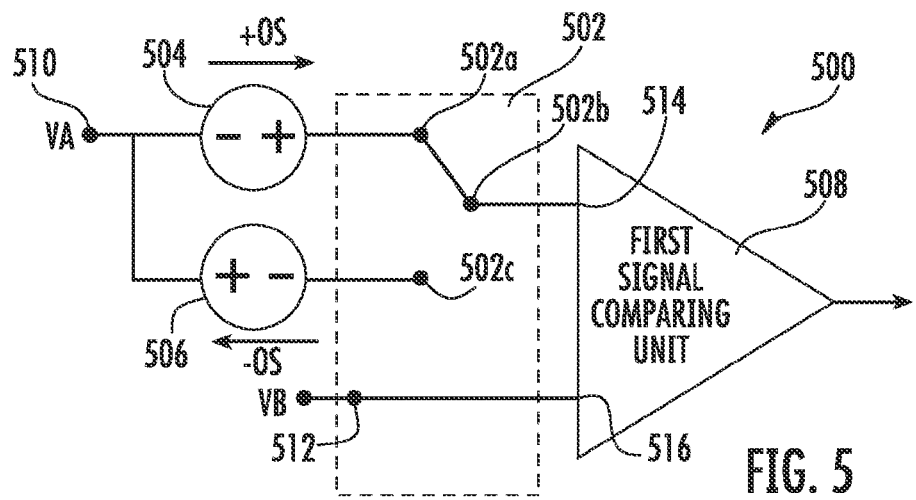
FIG. 5 is a schematic block diagram of a third receiver circuit that can be utilized to implement offset signal generation in a signal transmission network.

FIG. 5 is a schematic block diagram of a receiver circuit 500, which can be utilized to implement one embodiment of the present invention. For example, receiver circuit 500 can be utilized to implement a second alternative input section for receiver circuit 200 shown in FIG. 2. Referring to FIG. 5, receiver circuit 500 includes a switching unit 502, a positive offset signal generating unit 504, a negative offset signal generating unit 506, and a first signal comparing unit 508. Receiver circuit 500 also includes a first input connection 510 and a second input connection 512. For example, first input connection 510 can be connected to signal communication line 128 in FIG. 1, and second input connection 512 can be connected to signal communication line 126. In that regard, a (e.g., differential) signal conveyed on signal communication lines 126, 128 can be received at first and second input connections 510, 512. First input connection 510 is also connected to a first input 514 of first signal comparing unit 508 via switching unit 502. For this example implementation, first input connection 510 is connected to first input 514 via a first offset signal (e.g., +OS) generating unit 504, a first switch contact 502a, and a second switch contact 502b. Also, second input connection 512 is connected to a second input 516 of first signal comparing unit 508. Alternatively, depending upon the switched position of switching unit 502, first input connection 510 can also be connected to first input 514 of first signal comparing unit 508 via a second offset signal (e.g., −OS) generating unit 506, a third switch contact 502c, and second switch contact 502b. In this implementation, a positive offset signal or negative offset signal can be added to the signal received on first input connection 510.

Figure 6:
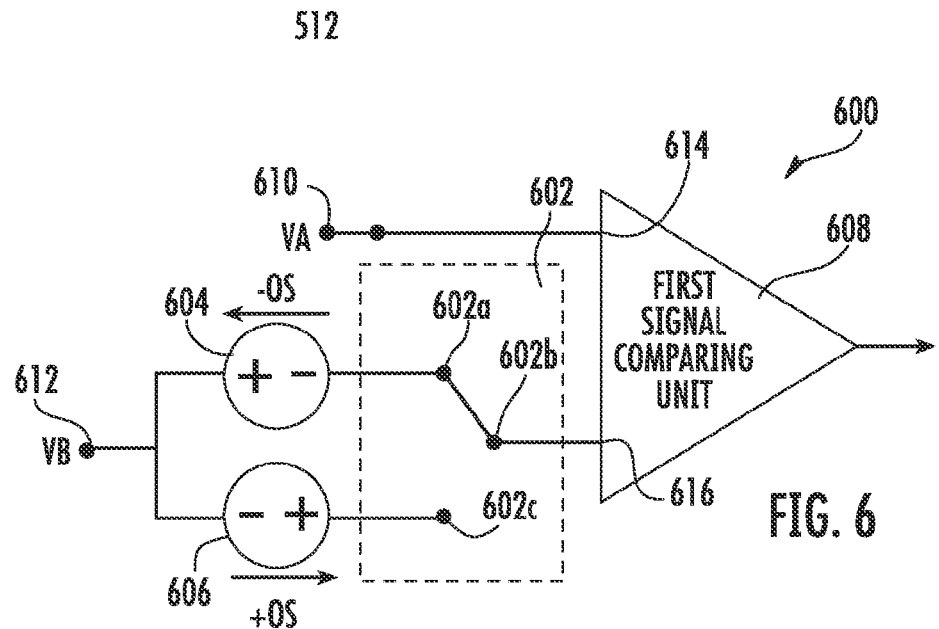
FIG. 6 is a schematic block diagram of a fourth receiver circuit that can be utilized to implement offset signal generation in a signal transmission network.

FIG. 6 is a schematic block diagram of a receiver circuit 600, which can be utilized to implement one embodiment of the present invention. For example, receiver circuit 600 can be utilized to implement a third alternative input section for receiver circuit 200 shown in FIG. 2. Referring to FIG. 6, receiver circuit 600 includes a switching unit 602, a negative offset signal generating unit 604, a positive offset signal generating unit 606, and a first signal comparing unit 608. Receiver circuit 600 also includes a first input connection 610 and a second input connection 612. For example, first input connection 610 can be connected to signal communication line 128 in FIG. 1, and second input connection 612 can be connected to signal communication line 126. In that regard, a (e.g., differential) signal conveyed on signal communication lines 126, 128 can be received at first and second input connections 610, 612. First input connection 610 is connected to a first input 614 of first signal comparing unit 608. Second input connection 612 is connected to a second input 616 of first signal comparing unit 608 via switching unit 602. For this example implementation, second input connection 612 is connected to second input 616 via a first offset signal (e.g., −OS) generating unit 604, a first switch contact 602a, and a second switch contact 602b. Alternatively, depending upon the switched position of switching unit 602, second input connection 612 can also be connected to second input 616 of first signal comparing unit 608 via a second offset signal (e.g., +OS) generating unit 606, a third switch contact 602c, and second switch contact 602b. In this implementation, a positive offset signal or negative offset signal can be added to the signal received on second input connection 612.

Figure 7:
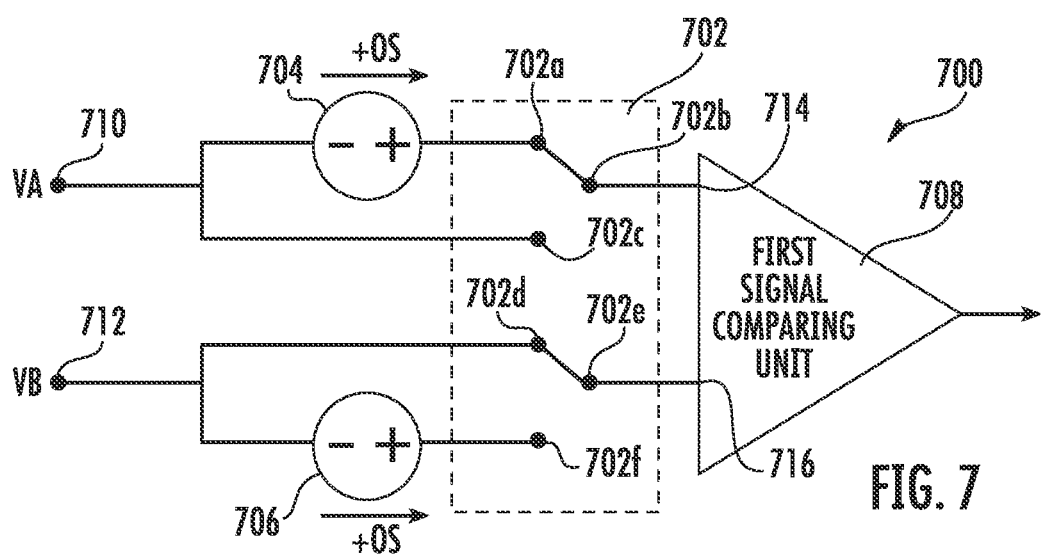
FIG. 7 is a schematic block diagram of a fifth receiver circuit that can be utilized to implement offset signal generation in a signal transmission network.

FIG. 7 is a schematic block diagram of a receiver circuit 700, which can be utilized to implement one embodiment of the present invention. For example, receiver circuit 700 can be utilized to implement a fourth alternative input section for receiver circuit 200 shown in FIG. 2. Referring to FIG. 7, receiver circuit 700 includes a switching unit 702, a first positive offset signal generating unit 704, a second positive offset signal generating unit 706, and a first signal comparing unit 708. Receiver circuit 700 also includes a first input connection 710 and a second input connection 712. For example, first input connection 710 can be connected to signal communication line 128 in FIG. 1, and second input connection 712 can be connected to signal communication line 126. In that regard, a (e.g., differential) signal conveyed on signal communication lines 126, 128 can be received at first and second input connections 710, 712. First input connection 710 is connected to a first input 714 of first signal comparing unit 708. Second input connection 712 is connected to a second input 716 of first signal comparing unit 708 also via switching unit 702. For this example implementation, first input connection 710 is connected to first input 714 via a first offset signal (e.g., +OS) generating unit 704, a first switch contact 702a, and a second switch contact 702b. Also, second input connection 712 is connected to second input 716 via a third switch contact 702d, and a fourth switch contact 702e. Alternatively, depending upon the switched position of switching unit 702, first input connection 710 can also be connected to first input 714 of first signal comparing unit 708 via a fifth switch contact 702c, and second switch contact 702b. Also, second input connection 712 can be connected to second input 716 of first signal comparing unit 708 via a second offset signal (e.g., +OS) generating unit 706, a sixth switch contact 702f, and fourth switch contact 702e. In this implementation, a positive offset signal can be added to the signal received on first input connection 710 or second input connection 712.

In yet another embodiment, if an inverted signal polarity condition exists (e.g., as described directly above), a different first switching unit in receiver circuit 200 can be utilized to re-reverse the electronically-reversed signals, before these signals reach the offset signal generator unit section. In this embodiment, a single offset signal generator unit is sufficient to implement the full fail-safe capability, and no second signal comparing unit is required.

As an additional point, receiver circuit 200 provides a programmable receive threshold for full fail-safe functionality by generating internal negative and positive offset signals or voltages. As such, receiver circuit 200 enables a user to change the receiver threshold for full fail-safe functionality by selecting suitable negative and positive offset signals or voltages for a particular signal transmission network design. In that regard, such a positive or negative offset signal or voltage can be generated in numerous ways. For example, an offset signal or voltage can be generated by utilizing a bias voltage, such as a voltage generated by passing a current through one or more resistors. Also, for example, in a differential signal network, an offset voltage can be produced by mismatching the input differential stage of a signal comparator, if one is utilized.

Although specific embodiments have been illustrated and described herein, it will be appreciated by those of ordinary skill in the art that any arrangement that is calculated to achieve the same purpose, may be substituted for the specific embodiments shown. Therefore, it is intended that the present invention be limited only by the claims and the equivalents thereof.

What is claimed is:

1. A system, comprising:
    at least a first electronic circuit to transmit and receive signals or data;
    at least one driver unit coupled to the at least a first electronic circuit; and
    at least one receiver unit coupled to the at least a first electronic circuit and the at least one driver unit, wherein the at least one receiver unit includes:
    at least one offset signal generating unit;
    a signal comparing unit;
    a switching unit to couple an offset signal from the at least one offset signal generating unit to an input of the signal comparing unit; and
    a second signal comparing unit, wherein a first input of the second signal comparing unit is connected to an output of the signal comparing unit, and a second input of the second signal comparing unit is enabled to receive a control signal associated with at least one of normal polarity and an inverted or reverse polarity.

2. The system of claim 1, wherein the offset signal is a positive voltage or a negative voltage that is coupled to the input of the signal comparing unit in a normal polarity mode, or coupled to a second input of the signal comparing unit in an inverted or reverse polarity mode.

3. The system of claim 1, wherein the system comprises a signal transmission network.

4. The system of claim 1, wherein the system comprises a differential signal transmission network.

5. The system of claim 1, wherein the system comprises a differential data transmission network operated in accordance with an RS-485 or RS-422 data transmission standard.

6. The system of claim 1, wherein the at least one driver unit is coupled to the at least one receiver unit by a network bus.

7. The system of claim 1, wherein the at least one driver unit comprises a driver of a first transceiver, and the at least one receiver unit comprises a receiver of a second transceiver.

8. The system of claim 1, wherein the switching unit comprises a transistor switch, the signal comparing unit comprises a comparator, and the second signal comparing unit comprises an exclusive-OR (XOR) logic gate.

9. The system of claim 1, wherein the switching unit comprises an analog transistor switch, the signal comparing unit comprises a signal comparator, and the second signal comparing unit comprises a multiplexer and a signal inverter.

10. A receiver circuit, comprising:
    a first offset signal generating unit;
    a second offset signal generating unit;
    a first signal comparing unit;
    a switching unit to couple an offset signal from at least one of the first offset signal generating unit and the second offset signal generating unit to an input of the first signal comparing unit; and
    a second signal comparing unit, wherein a first input of the second signal comparing unit is connected to an output of the first signal comparing unit, and a second input of the second signal comparing unit is enabled to receive at least one of a normal polarity control signal and an inverted or reverse polarity control signal.

11. The receiver circuit of claim 10, wherein the first signal comparing unit is a comparator, and the second signal comparing unit is an XOR logic gate.

12. The receiver circuit of claim 10, wherein the first signal comparing unit is a comparator including a plurality of differential inputs.

13. The receiver circuit of claim 10, wherein an offset signal generated by the first offset signal generating unit is a first polarity associated with a normal input polarity condition, and an offset signal generated by the second offset signal generating unit is an opposite polarity associated with an inverted or reverse input polarity condition.

14. The receiver circuit of claim 10, wherein the offset signals generated by the first offset signal generating unit and the second offset signal generating unit are the same polarity if an offset signal generated by the first offset signal generating unit is coupled to a first input of the first signal comparing unit in a normal input polarity condition, and an offset signal generated by the second offset signal generating unit is coupled to a second input of the first signal comparing unit in an inverted or reverse polarity condition.

15. The receiver circuit of claim 10, further comprising the second signal comparing unit coupled to the output of the first signal comparing unit, wherein if a logic high signal is received on the first input of the second signal comparing unit, and a normal polarity control signal is received on the second input of the second signal comparing unit, a second logic high signal is output from the second signal comparing unit.

16. The receiver circuit of claim 10, further comprising the second signal comparing unit coupled to the output of the first signal comparing unit, wherein if a logic low signal is received on the first input of the second signal comparing unit, and an inverted polarity control signal is received on the second input of the second signal comparing unit, a logic high signal is output from the second signal comparing unit.

17. The receiver circuit of claim 10, wherein the switching unit is a transistor switch, the first signal comparing unit is a comparator, the second signal comparing unit is an XOR logic gate, and the receiver circuit is a Complementary Metal-Oxide Semiconductor (CMOS) circuit.

* * * * *